United States Patent
Tamai et al.

[19]

[11] Patent Number: 5,912,301
[45] Date of Patent: Jun. 15, 1999

[54] GRAFT-MODIFIED POLYOLEFIN RESINS AND RESIN COMPOSITIONS CONTAINING THE SAME

[75] Inventors: Kazuhiko Tamai, Hyogo; Shinji Ozawa, Kyoto; Kenji Kurimoto; Haruo Tomita, both of Hyogo, all of Japan

[73] Assignee: Kanegafuchi Kagaku Kogyo Kabushiki Kaisha, Osaka, Japan

[21] Appl. No.: 08/894,485

[22] PCT Filed: Feb. 22, 1996

[86] PCT No.: PCT/JP96/00400

§ 371 Date: Aug. 22, 1997

§ 102(e) Date: Aug. 22, 1997

[87] PCT Pub. No.: WO96/26230

PCT Pub. Date: Aug. 29, 1996

[30] Foreign Application Priority Data

Feb. 24, 1995 [JP] Japan ................................. 7-036806
May 10, 1995 [JP] Japan ................................. 7-137156
Jun. 8, 1995 [JP] Japan ................................. 7-168361
Jun. 8, 1995 [JP] Japan ................................. 7-168363

[51] Int. Cl.[6] ............................. C08L 51/06; C08L 77/00; C08L 67/00
[52] U.S. Cl. ................................. 525/66; 525/63; 525/67; 525/69; 525/286; 525/285; 525/293
[58] Field of Search ..................... 525/286, 293, 525/285, 66, 67, 63, 69

[56] References Cited

U.S. PATENT DOCUMENTS 5,302,665  4/1994  Mishima et al. .......................... 525/71

FOREIGN PATENT DOCUMENTS

| | | |
|---|---|---|
| 2-160812 | 6/1990 | Japan . |
| 2-160813 | 6/1990 | Japan . |
| 5-339323 | 12/1993 | Japan . |
| 6-116343 | 4/1994 | Japan . |
| 7-126333 | 5/1995 | Japan . |
| 7-126334 | 5/1995 | Japan . |
| 7-149960 | 6/1995 | Japan . |

*Primary Examiner*—Mark L. Warzel
*Attorney, Agent, or Firm*—Armstrong, Westerman, Hattori, McLeland & Naughton

[57] ABSTRACT

A graft-modified polyolefin resin is provided, which is obtained by preparing a aqueous suspension containing (a1) 100 parts by weight of a polyolefin resin, (a2) 0.1 to 30 parts by weight of a mixture of 1 to 1000 parts by weight of an unsaturated glycidyl ester to 100 parts by weight of a compound having a glycidyl group as represented by a general formula (I):

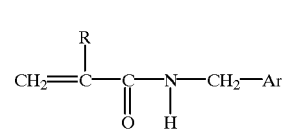

wherein Ar is an aromatic hydrocarbon group of $C_6$–$C_{23}$ having at least one glycidyloxy group, and R is a hydrogen atom or a methyl group, (a3) 0.1 to 500 parts by weight of a vinyl monomer, and (a4) 0.001 to 10 parts by weight of a radical initiator to 100 parts by weight in total of (a2) and (a3), to thus impregnate (a1) with (a2) and (a3), and polymerizing (a2) and (a3) onto (a1). Resin compositions containig the graft-modified polyolefin resin have not only well-balanced mechanical properties, but excellent moldability.

9 Claims, No Drawings

GRAFT-MODIFIED POLYOLEFIN RESINS AND RESIN COMPOSITIONS CONTAINING THE SAME

FIELD OF THE INVENTION

The present invention relates to graft-modified polyolefin resins and resin compositions containing the same, more particularly to resin compositions usable for automobile parts, home electric appliances, industrial components, and sports goods and being well balanced in physical propterties such as mechanical properties, namely, impact resistance, elongation, rigidity, etc., or molding characteristics.

BACKGROUND ART

The polyolefin resins have excellent mechanical, chemical, physical properties, and molding characteristics, and are widely used as unexpensive plastic materials. Above all, for example, polypropylenes, polyethylenes, ethylene-propylene copolymers, ethylene-propylene-nonconjugated diene copolymers are blended with thermoplastic resins such as polyester resins, polyamide resins and polycarbonate resins in an attempt to save the weight of said resins and to improve their mechanical properties such as impact properties. However, as the polyolefin resin has no polarity, it is less compatible with such thermoplastic resins and a simple mixing of the both resins can not provide any uniform dispersion, thus resulting in decrease of the mechanical properties such as rigidity, breaking strength etc, and if molded, products may cause peeling on their surface, whereby no compositions having intended physical propterties are obtainable.

In this connection, for the purpose of improving compatibility between polyolefin resins and thermoplastic resins, Japanese Laid-Open Patent publication No.5-287138 has proposed a process for blending olefin elastomers modified by unsaturated glycidyl compounds with polyester resins, and Japanese Laid-Open Patent publications Nos.1-144445, 2-160812, and 2-160813 have proposed bledning processes for ethylene-propylene-nonconjugated diene copolymers modified by glycidyl methacrylate and polyster resins. It is true that said proposed processes could definitely improve the impact properties of the products, but such modified olefin elastomers were found poor in flowability, and represented excessive reactions against the polyester resins so that there could cause a deterioration in flowability of the resulted resin compositions.

Furthermore, Japanese Laid-Open Patent publication No. 7-149960 has proposed a process of using polyolefin resins modified by compounds having a specific glycidyl group, or the compounds having a specific glycidyl group and vinyl monomers to improve the impact properties of thermoplastic resins such as polyester resins and polyamide resins. Although this process may improve the mechanical properties such as impact properties of the thermoplastic resins without fail, it is necessary to use a great amount of modified polyolefin resins in order to ensure a sufficient improvement effect, but such a use may cause decrease in rigidity or breaking strength.

The present invention is to provide a graft-modified polyolefin resin obtained by graft-polymerizing onto a polyolefin resin, a mixture of a compound having specific glycidyl group with an unsaturated glycidyl ester, and a vinyl monomer, and resin compositions comprising said modified polyolefin resin and a theremoplastic resin, said resin compositions being well blanced in mechanical properties such as impact resistance, elongation, rigidity and molding properties.

The present inventors have made an extensive series of studies in an attempt to solve the above problems, and have found that the above object could be attained by using a graft-modified polyolefin resin obtained by graft-polymerizing onto a polyolefin resin, a mixture of a compound having a specific glycidyl group and an unsaturated glycidyl ester, and a vinyl monomer, having thereby reached the present invention.

DISCLOSURE OF THE INVENTION

The present invention is, in a first aspect, to provide a graft-modified polyolefin resin obtained by preparing a aqueous suspension containing (a1) 100 parts by weight of a polyolefin resin, (a2) 0.1 to 30 parts by weight of a mixture of 1 to 1000 parts by weight of an unsaturated glycidyl ester to 100 parts by weight of a compound having a glycidyl group as represented by a general formula (I)

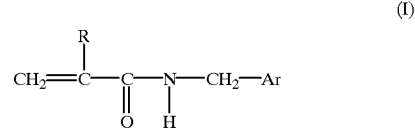

wherein Ar is an aromatic hydrocarbon group of $C_6$–$C_{23}$ having at least one glycidyloxy group, and R is a hydrogen atom or a methyl group, (a3) 0.1 to 500 parts by weight of a vinyl monomer, and (a4) 0.001 to 10 parts by weight of a radical initiator to 100 parts by weight in total of said components (a2) and (a3), to thus impregnate said component (a1) with the components (a2) and (a3) in said aqueous suspension, and graft-polymerizing the components (a2) and (a3) onto the component(a1).

The present invention is, in a second aspect, to provide a resin composition comprising (A) 1 to 100 parts by weight of the above-mentioned graft-modified polyolefin resin, and (B) 100 parts by weight of at least one resin selected from the group consisting of polyester resins, polyamide resins and polycarbonate resins.

The present invention is, in a third aspect, to provede a resin composition comprising (A) 1 to 100 parts by weight of the above-mentioned graft-modified polyolefin resin, 100 parts by weight of resins comprising (B) 95 to 50 parts by weight of at least one resin selected from the group consisting of polyester resins, polyamide resins and polycarbonate resins, and (C) 5 to 50 parts by weight of a polyolefin resin.

BEST MODES FOR CARRYNG OUT THE INVENTION

The graft-modified polyolefin resin (A) of the present invention is produced by graft-polymerizing onto a polyolefin resin (a1), a mixture of a compound (a2) having a glycidyl group represented by a general formula (I)

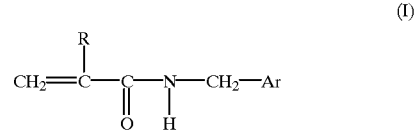

wherein Ar is an aromatic hydrocarbon group of $C_6$–$C_{23}$ having at least one glycidyloxy group, and R is a hydrogen atom or a methyl group, and an unsaturated glycidyl ester, and a vinyl monomer (a3) in the presence of a radical initiator (a4) in an aquesous susepnsion.

The polyolefin resin (a1) being graft-modified includes, for example, homopolymers or copolymers comprising one or more combinations selected from the group consisting of ethylene, propylene, 1-butene, 1-pentene, isobutene, butadiene, isoprene, chloroprene, phenylpropadiene, cyclopentadiene, 1,3-cyclohexadiene, 1,4-hexadiene, 1,3-octadiene, 1,5-cyclooctadiene, methylene norbornene, 1,5-norbornadiene, ethylidene norbornene andα, ω-nonconjugated dienes. These may be used individually or in combination of two or more.

As the compound having a glycidyl group as one of the components (a2) for modifying the polyolefin resin (a1), a compound as represented by the general formula (I) is preferably used.

The compound having said glycidyl group is an important component of the present invention, and is derived from a compound having in the molecule at least one acrylamide group and one glycidyl group, said acrylamide group including methacrylamide.

Such a compound can be produced by a process, for example, as disclosed in Japanese Laid-Open Patent publication No.60-130580. That is, the intended compound may be obtained by steps of condensing an aromatic hydrocarbon having at least one phenolic hydroxyl group and N-methylol acrylamide or N-methylol methacrylamide in the presence of an acidic catalyst, and then subjecting to glycidylization of the hydroxyl group by the use of epihalohydrin. As the aromatic hydrocarbon having at least one phenolic hydroxyl group, a phenolic compound having 6 to 23 carbon atoms may be used. Specific examples of said phenolic compounds are phenol, cresol, xylenol, carvacrol, thymol, naphthol, resorcin, hydroquinone, pyrogallol and phenanthrol. Among those, the univalent phenols having alkyl substituent groups are preferable.

For example, if 2,6-xylenol and N-methylol acrylamide are used as starting materials, a compound as represented by a structural formula (II) is obtainable.

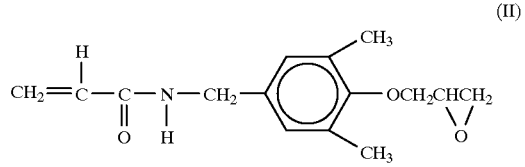
(II)

Moreover, if ortho-cresol and N-methylol acrylamide are used as starting materials, a compound as represented by a structural formula (III) is obtainable.

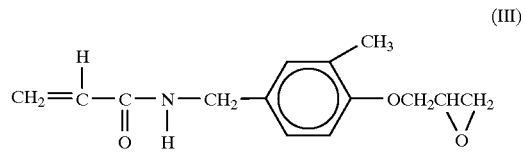
(III)

Of the above-mentioned compounds, the compounds represented by the structural formula (II) are preferably used in particular.

Another compound of the component (a2) used in the present invention, namely, the unsaturated glycidyl ester includes, for example, glycidyl acrylate, glycidyl methacrylate, mono- and di-glycidyl esters of itaconic acid, mono-, di- and tri-glycidyl esters of butene tricarboxylic acid, mono- and di-glycidyl esters of citraconic acid, mono- and di-glycidyl esters of end-cis-bicyclo (2,2,1) hepto-5-en-2,3-dicarboxylic acid, mono- and di-glycidyl esters of end-cis-bicyclo (2,2,1) hepto-5-en-2-methyl-2,3-dicarboxylic acid, mono- and di-glycidyl esters of allyl succinic acid, glycidyl ester of p-stylene carboxylic acid. These are used individually or in combination of two or more. Of the above-mentioned compounds, the glycidyl methacrylate is desirable in terms of cost and its degree of impregnation to polyolefin resins.

The total amount of the mixture of the compound having a glycidyl group as represented by the general formula (I) and the unsaturated glycidyl ester is 0.1 to 30 parts by weight, preferably 0.5 to 20 parts by weight to 100 parts by weight of the polyolefin resin (a1). The total amount of the both compounds exceeding said range induces decrease of mechanical properties and flowability, and the amount less than said range brings an insufficient effect of modification to the polyolefin resins. The proportion of the compound having a glycidyl group as represented by the general formula (I) and the unsaturated glycidyl ester is preferably 1 to 1000 parts by weight of the unsturated glycidyl ester to 100 parts by weight of the compound having a glycidyl group as represented by the general formula (I). If the proportion of the unsaturated glycidyl ester is more than said range, flowability becomes low, and if less than said range, the mechanical properties become less balanced.

As the vinyl monomer (a3) forming the graft-modified polyolefin resin (A), the following compounds are included. For example, aromatic vinyl compounds; stylene, o-methylstylene, p-methylstylene, m-methylstylene, α-methylstylene, vinyltoluene and divinylbenzene, methacrylic acid alkyl esters having 1 to 22 carbon atoms; methyl methacrylate, ethyl methacrylate, i-propyl methacrylate, n-butyl methacrylate, t-butyl methacrylate, 2-ethylhexyl methacrylate and stearyl methacrylate, acrylic acid alkyl esters having 1 to 22 carbon atoms; methyl acrylate, ethyl acrylate, i-propyl acrylate, n-butyl acrylate, t-butyl acrylate, 2-ethylhexyl acrylate and stearyl acrylate, vinyl alkyl ethers having 1 to 22 carbon atoms; vinyl methyl ether, vinyl ethyl ether, vinyl n-propyl ether, vinyl ipropyl ether, vinyl i-butyl ether, vinyl n-amyl ether, vinyl i-amyl ether, vinyl 2-ethylhexyl ether and vinyl octadecyl ether, unsturated nitorile compounds; acrylo nitrile and methacrylo nitrile, unsaturated amino compounds; acrylamide and methacryl amide, maleic acid dialkyl esters; maleic acid di-n-amyl ester, maleic acid di-n-butyl ester, maleic acid di-i-amyl ester, maleic acid di-i-butyl ester, maleic acid dimethyl ester, maleic acid di-n-propyl ester, maleic acid di-octyl ester and maleic acid dinonyl ester, allyl alkyl ethers having 1 to 8 carbon atoms; allyl ethyl ether and allyl n-octyl ether, diene compounds; dicyclopentediene, butadiene, isoprene, chloroprene, phenyl propadiene, cyclopentadiene, 1,5-norbornadiene, 1,3-cyclohexadiene, 1,4-cyclohexadiene, 1,5-cyclohexadiene and 1,3-cyclooctadiene, and other vinyl monomers; allyl methacrylate, acrylic acid, methacrylic acid, maleic acid, maleic acid anhydride and vinyl acetate. These may be used individually or in combination of two or more.

The amount of the vinyl monomer (a3) is 0.1 to 500 parts by weight, preferably 0.1 to 200 parts by weight, more preferably 0.1 to 100 parts by weight to 100 parts by weight of the polyolefin resin (a1). If it exceeds said range, polymerization is principally made between the vinyl monomers, so that there arise excessive agglomeration, fusing or mass-forming in the aqueous suspension. If it is less than said rnage, uniform impregnation and the graft-polymerization with the mixture of the compound (a2) as represented by the general formula (I) and the unsaturated glycidyl ester onto the polyolefin resin (a1) become difficult.

The radical initiator (a4) used in the production of the graft-modified polyolefin resin (A) includes, for example, organic peroxides such as methyl ethyl ketone peroxide, di-t-butyl peroxide, 1,1-bis (t-butylperoxy)-3,3,5-trimethyl cyclohexane, n-butyl-4,4-bis (t-butylperoxy) valerate, 2,5-dimethylhexane-2,5-dihydroperoxied, αα'-bis (t-butylperoxy-m-isopropyl) benzene, 2,5-dimethyl-2,5-di (t-butylperoxy) hexane, 2,5-dimethyl-2,5-di (t-butylperoxy) hexine-3 and benzoyl peroxide, and azo compounds such as 1,1'-azobis (cyclohexane-1-carbonitrile), 1-[(1-cyano-1-methylethyl) azo] formamide, 2-phenylazo-4-methoxy-2,4-dimethyl-valeronitrile, 2,2'-azobis (2-methyl butyronitrile), 2,2'-azobisisobutyronitrile, 2,2'-azobis (2, 4,4-trimetylpentane), 2,2'-azobis (2-acetoxypropane) and 2,2'-azobis (2-acetoxybutane). These amy be used individually or in combination of two or more. Moreover, these are optinally selected according to the conditions of impregnation or polymerization.

The amount of the radical initiator (a4) is 0.001 to 10 parts by weight, preferably 0.05 to 5 parts by weight to 100 parts by weitht in total of the mixture of the compounds (a2) having a glycidyl group as represented by the general formula (I) and the unsaturated glycidyl ester, and the vinyl monomer (a3). If it exceeds said range, there arise thickening due to excessive crosslinking or decrease of molecular weight due to breaking of main chains. If it is less than said range, there arises insufficient polymerization.

The graft-modified polyolefin resin (A) in accordance with the present invention is produced by process steps of preparing an aqueous suspension containing the polyolefin resin (a1), the mixture of compounds (a2) having a glycidyl group as represented by the general formula (I) and the unsaturated glycidyl ester, the vinyl monomer (a3), and the radical initiator (a4), and heating, if necessary, the aqueous suspension to bring said contents into contact with each other, in such a manner that homopolymerization or copolymerization of the mixture of the compound having a glycidyl group as represented by the general formula (I) and the unsaturated glycidyl ester, and vinyl monomer (a3) does not take place, then heating the aqueous suspension containing the polyolefin resin (a1) impregnated with the mixtuer of compound (a2) having a glycidyl group as represented by the general formula (I) and the unsaturated glycidyl ester, and the vinyl monomer (a3) at a temperature higher than that at which the polyolefin resin (a1) is substantially melted, and polymerizing the mixture of the compound (a2) having a glycidyl group and the unsaturated glycidyl ester, and the vinyl monomer (a3), thereby to allow uniform and effective grafting of the mixture of compound (a2) having a glycidyl group as represented by the general formula (I) and the unsaturated glycidyl ester, and the vinyl monomer (a3) onto the plyolefin resin (a1).

The graft-modified polyolefin resin in accordance with the present invention may be obtained using, for example, water, a suspending agent, an emulsifying agent, a dispersing agent and organic solvents, and there is no particular limitation on the kinds of these substances and on the conditions such as polymerization pressure, stirring etc., if the aqueous suspension comprising the reacted mixture of the components may be kept in such a stable state that agglomeration or fusion does not occur.

The polyester resin used as a component (B) in the present invention is not specifically limited if it is a thermoplastic polyester resin for use in molding. Examples are polymers or copolymers, obtained by condensation reaction of aromatic dicarboxylic acids or ester-formable derivatives thereof and diols or ester-formable derivatives thereof as principal ingredients, or ring opening polymers of lactone.

The aromatic dicarboxylic acid includes, for example, terephthalic acid, iso-phthalic acid, phthalic acid, 2,6-naphthalene dicarboxylic acid, bis (p-carboxyphenyl) methane, anthracene dicarboxylic acid, 4,4'-di-phenyl dicarboxylic acid, or 4,4'-diphenylether dicarboxylic acid. The ester-formable derivative of said aromatic dicarboxlyic acid includes ester-formable derivatives of said specific examples. These aromatic dicarboxylic acids or their ester-formable derivatives may be used individually or in combination of two or more.

The diol includes, for example, aliphatic diols having 2 to 10 carbon atoms such as ethylene glycol, 1,3-propane diol, 1,4-butane diol, neopentyl glycol, 1,5-pentane diol, 1,6-hexane diol, 1,8-octane diol, cyclohexane diol, and long chain glycols having a molecular weight of 400 to 6000 such as polyethylene glycol, poly-1,3-propylene glycol, or poly-tetramethylene glycol. The ester-formable derivative of diol includes ester-formable derivatives of said specific examples. These diols or their ester-formable derivatives may be used individually or in combination of two or more.

Examples of said polyester resins are polyethylene therephthalate, polypropylene terephthalate, polybutylene terephthalate, polyhexamethylene therephthalate, polyethylene-2,6-naphthalate, and a mixture of polyethylene terephthalate and polybutylene terephthalate.

The polyamide resin used as a component (B) is not specifically limited if it may be used for molding purpose. Examples are polymers as obtained from condensation reaction of aliphatic amino acids, lactams, diamines and dicarboxylic acids as principal ingredients, or copolymer polyamides with a small amount of aromatic and other aliphatic ingredients introduced into the aliphatic ingredient.

Examples of said aliphatic amino acid are 6-amino caproic acid, 11-amino undecanoic acid, and 12-amino dodecanoic acid. Examples of said lactam are ε-caprolactam, and ω-laurolactam. Examples of said diamine are tetramethylene diamine, hexamethylene diamine, undecamethylene diamine, and dodecamethylene diamine.

Examples of said dicarboxylic acids are adipic acid, azelaic acid, sebacic acid, dodecanoic diacid, and diglycolic acid.

Examples of said polyamide resin are polycaproamide (nylon 6), polyhexamethylene adipamide (nylon 66), poly-tetramethylene adipamide (nylon 46), polydodecanamide (nylon 12), and these may be used individually or in combination of two or more.

The polycarbonate resins used as a component (B) in the present invention is not specifically limited if it may be used for molding purpose. Examples are aromatic polycarbonate resins, aliphatic polycarbonate resins, and aliphatic-aromatic polycarbonate resins, and among the above-described resins, the aromatic polycarbonate resins may preferably be used. The aromatic polycarbonate resins are generally produced by the reaction of aromatic dihydroxy compounds and carbonate precursors.

Examples of said aromatic dihydroxy compounds are bisphenols such as 2,2-bis (4-hydroxyphenyl) propane, bis (4-hydroxyphenyl) methane, 2,2-(4-hydroxy-3,5-dimethylphenyl) propane, 2,2-bis (4-hydroxy-3,5-dibromophenyl) propane, 2,2-bis (4-hydroxy-3-methylphenyl) propane; di-hydric phenol ethers such as bis (4-hydroxy phenyl) ether and bis (3,5-dichloro-4- hydroxyphenyl) ether; dihydroxy diphenyls such as p,p'-dihydroxy diphenyl and 3,3'-dichloro-4,4'-dihydroxy diphenyl; dihydroxy allyl sulfones such as bis (4-hydroxyphenyl) sulfone and bis (3,5-dimethyl-4-hydroxyphenyl) sulfone; dihydroxy benzenes such as resorcinol, and hydroquinone; dihydroxy benzenes substituted by hologen or alkyl group such as 1,4-dihydroxy-2,5-dichlobenzene and 1,4-dihydroxy-3-methylbenzene; dihydroxy diphenyl sulfides such as bis (4-hydroxyphenyl) sulfide, bis (4-hydroxyphenyl) sulfoxide and bis (3,5-dibromo-4-hydroxyphenyl) sulfoxide, and dihydroxydipheyl sulfoxides. These may be used indivedually or in combination of two or more. Of these compounds, 2,2-bis (4-hydroxyphenyl) propane may properly be used.

Examples of said carbonate precursor are carbonyl halides as represented by phosgene, carbonyl esters as represented by dipheyl carbonate, or haloformates. These may be used individually or in combination of two or more.

The polycarbonate resins as used in the present invention may be in a partially branched form, for example, thermoplastic random branched polycarbonate resins produced by the reaction of polyfunctional aromatic compounds and dihydric phenols and carbonate precursors may be used. Moreover, a mixture of straight chain polycarbonates and said random branched polycarbonates may also be used.

Examples of said polyfunctional aromatic compounds are 1,1,1-tri (4-hydroxyphenyl) ethane, trimellitic anhydride, trimellitic acid, trimellitoil trichloride, 4-chloroformyl phthalic anhydride, pyromellitic acid, pyromellitic dianhydride, mellitic acid, mellitic anhydride, trimesic acid, benzophenontetracarboxylic acid, benzophenontetracarboxylic anhydride. These may be used individually or in composition of two or more.

In the resin compositions of the present invention, the amount of the graft-modified is polyolefin resin (A) is 1 to 100 parts by weight, preferably 1 to 50 parts by weight to 100 parts by weight of at least one resin (B) selected from the group consisting of polyester resins, polyamide resins and polycarbonate resins.

If the amounts of the respective components (A) and (B) are outside said ranges, the physical properties such as heat resistance, impact resistance, rigidity, surface properties, molding properties and chemical resistance are insufficiently balanced.

The resin compositions comprising the graft-modified polyolefin resin (A), at least one resin (B) selected from the group consisting of polyester resins, polyamide resins, and polycarbonate resins may further contain a polyolefin resin (C). The polyolefin resin (C) to be used here may be identical to the polyolefin resin (a1), a component of said graft-modified polyolefin resin (A). Specifically, examples are homopolymers or copolymers comprising at least one selected from the group consisting of ethylene, propylene, 1-butene, 1-pentene, isobutene, butadiene, isoprene, chloroprene, phenylpropadiene, cyclopentadiene, 1,3-cyclohexadiene, 1,4-hexdiene, 1,3-octadiene, 1,5-cyclooctadiene, ethyliden norbornene andα, ω-nonconjugated dienes. These may be used individually or in combination of two or more. In case where the polyolefin resin (C) is used, the amount of said graft-modified polyolefin resin (A) is 1 to 100 parts by weight to 100 parts by weight of 95 to 50 parts by weight of at least one resin (B) selcted from said polyester resins, polyamide resins and polycarbonate resins and 5 to 50 parts by weight of the polyolefin resin (C). If the amounts of the components are outside said ranges, the physical properties such as heat resistance, impact resistance, rigidity, surface properties, molding properties, and chemical resistance are insufficiently balanced.

Examples of a filler available for the present invention includes, for example, silica, talc, mica, glass fiber, glass beads, hollow glass bead, glass flake, neutral clays, carbon fiber, aromatic polyamide fiber, aromatic polyester fiber, vinylon fiber, carbon fiber, carbonized silicon fiber, alumina fiber, potassium titanate fiber and metal fiber. Those fillers may be used individually or in combination of two or more. The amount of the filler is 1 to 100 parts by weight, preferably 5 to 50 parts by weight, to 100 parts by weight of the resin composition comprising the graft-modified polyolefin resin (A) and at least one resin (B) selected from polyester resins, polyamide resins, and polycarbonate resins, or the resin composition comprising the graft-modified polyolefin resin (A) and at least one resin (B) selected from polyester resin, polyamide resins, and polycarbonate resins, and the polyolefin resin (C). If the amount is more than the range, balance in physical properties such as molding fluidity lowers. If it is less than the range, an addition effect is insufficient.

Examples of the flame retardant available for the present invention includes halogenated flame retardants such as tetrabromobisphenol A, 2,2-bis (4-hydroxy-3,5-dibromophenyl) propane, hexabromobenzene, tris (2,3-dibromopropyl) isocyanurate, 2,2-bis (4-hydroxy ethoxy-3, 5-dibromophenyl) propane, decabromodiphenyl oxide, brominated polyphosphate, chlorinated polyphosphate and chlorinated paraffin; phosphorous flame retardants such as ammonium phosphate, tricresyl phosphate, triethyl phosphate, trisshloroethyl phosphate, tris (β-chloroethyl) phosphate, trisdichloropropyl phosphate, cresyl phenyl phoshate, xyleny diphenyl phosphate, acidic phosphoric acid ester and nitrogen-containing phosphorous compound; inorganic flame retardants such as red phosphor, zinc oxide, antimony trioxide, zirconium hydroxide, barium metaborate, aluminum hydroxide and magnesium hydroxide; and polymer flame retardants such as brominated polystyrenes, brominated poly-α-methylstyrenes, brominated poycarbonates, brominated polyepoxy resins, chlorinated polyethylenes, chlorinated poly-α-methylstyrenes, chlorinated polycarbonates and chlorinated polyepoxy resins. These may be used individually or in combination of two or more. The amount of the flame retardant is 1 to 50 parts by weight, preferably 3 to 30 parts by weight, to 100 weight parts of the resin compositions comprising the graft-modified polyolefin resin (A) and at least one resin (B) selected from polyester resins, polyamide resins and polycarbonate resins, or the graft-modified polyolefin resin (A), at least one resin (B) selected from polyester resins, polyamide resins and polycarbonate resins, and the polyolefin resin (C). If the amount is less than the range, an effect of the flame retardance is not obtained and if it is more than the range, molding fluidity and mechanical characteristics lower.

The resin compositions of the present invention may, if necessary, further contain a catalyst and/or a stabilizer such as antioxidants and light stabilizers to increase reactivity of the graft-modified polyolefin resin (A).

The catalyst is not specifically limited, usually selected from combinations of one or more of compounds of accelerating the reaction of a carboxyl group, a hydroxyl group and an ester group with a glycidyl group. Examples are amine compounds such as tertiary amines and quaternary amines, phosphorous compounds such as phophonium salts and phosphines, and imidazoles. Of these compounds, the phosphorous compounds are particularly preferable with respect to heat resistance and stability, specifically including phosphonium salts such as tetra-n-butyl phosphonium bromide, tetra-n-butyl phosphonium chloride, tri-n-butyl methyl phosphonium iodide, tri-n-butyl benzyl phosphonium chloride and tri-n-butyl allyl phosphonium bromide, and phosphines such as triphenyl phosphine. The amount of the catalyst is 0.001 to 2 parts by weight, preferably 0.005 to 1 part by weight, to 100 parts by weight of the resin compositions of the present invention. If the amount is less than the range, the reaction accelearating effect is not obtained, and if it is more than the range, mechanical characteristics lower.

The antioxidant available for the stabilizer includes, for example, phenol compounds and thioether compounds such as 2,4-bis (n-octylthio)-6-(4-hydroxy-3,5-di-t-butylanilino)-1,3,5-triazine, pentaerythrityl-tetrakis [3-(3,5 -di-t-butyl-4-hydroxyphenyl) propionate], 2,2-thiodiethylene bis [3-(3,5-di-t-butyl-4-hydroxyphenyl) propionate], octadecil-3-(3,5-di-t-butyl-4-hydroxyphenyl) propionate, 2,2-thiobis (4-methyl-6-t-butylphenol), 1,3,5-trimethyl-2,4,6-tris (3,5-di-t-butyl-4-hydroxybenzyl) benzene; or phosphorous compounds such as tetrakis (2,4-di-t-butylphenyl)-4,4-biphenylenphosphonite and tris (2,4-di-t-butylphenyl) phosphonite. The light stabilizer includes, for example, hindered amine compounds such as succinic acid dimethyl-1-(2-hydroxyethyl)-4-hydroxy-2,2,6,6-tetramethyl piperidine polycondensed compounds, poly [[6-(1,1,3,3-tetramethylbutyl) imino-1,3,5-triazine-2,4,diyll][2,2,6,6-tetramethyl-4-pipelidyl) imino]hexamethylene [2,2,6,6-tetramethylpibplidyl) imino]] and 2-(3,5-di-t-butyl-4-hydroxybenzyl) 2-n-butylmaronic acid bis (1,2,2,6,6-pentamethyl-4-pipelidyl). These may be used individually or in combination of two or more. The amount of the stabilizer is 0.01 to 20 parts by weight to 100 weight parts of the resin compositions of the present invention. If the amount is less than the range, a sufficient stabilizer addition effect is not obtained. If it is more than the range, mechanical characteristics lower.

Further, the present invention may, if necessary, further contain pigments, antistatic agents, nucleating agents, or thermoplastic crystalline resins or noncrystalline resins other than that of the present invention so long as they do not impair characteristics of the present invention.

As a method for producing the resin compositions of the present invention, a melt-kneading method is preferably used in which the components are first mixed, then melted and kneaded. The melt-kneading can be made by the use of known blenders such as extruders, heat rollers, Brabender®, or Banbary mixer®. As an economical method, a single-axis or multi-axes extruder is preferably used.

The present invention will be described in greater detail by way of examples but the present invention is in no manner limited thereto, numerous modifications being made without departing from the essence of the present invention.

In the following description, the terms "part(s)" and "%" mean "part(s)by weight" and "% by weight" respectively, unless otherwise specified.

EXAMPLE 1: PRODUCTION OF GRAFT-MODIFIED POLYLEFIN RESIN (MP01)

In a pressure-resistant closed reaction vessel, 500 parts of an ethylene-propylene copolymer rubber (EP02P® of JSR Co., Ltd.), 31 parts of N-[4-(2,3-epoxypropoxy-3,5-dimethylbenzyl] acrylamide, 31 parts of glycidyl methacrylate, and 63 parts of styrene, 1.5 parts of (1,1-bis (t-butylperoxy) 3,3,5-trimethylcyclohexane, 10.5 parts of potassium tertiary phosphate, and 0.315 part of an emulsifier (Latemul PS® of Kao Co., Ltd.) were added to 1400 parts of deionized water and an aqueous suspension was obtained with stirring. The aqueous solution was stirred at 95° C. for one hour, then further stirred at 110° C. for three hours to complete the graft-polymerization. The particles obtained were rinsed with water to remove the potassium tertiary phosphate and Latemul PS before being dried, thereby obtaining the graft-modified polyolefin resin (MP01).

EXAMPLE 2: PRODUCTION OF GRAFT-MODIFIED POLYOLEFIN RESIN (MP02)

A graft-modified polyolefin resin (MP02) was obtained in the same way as in Example 1 except that 31 parts of N-[4-(2,3-epoxypropoxy-3,5-dimethylbenzyl] acrylamide, 31 parts of glycidyl methacrylate and 63 parts of styrene were replaced with 31 parts of N-[4-(2,3-epoxypropoxy-3,5-dimethylbenzyl] acrylamide, 63 parts of glycidyl methacrylate, and 32 parts of styrene.

EXAMPLE 3: PRODUCTION OF GRAFT-MODIFIED POLYOLEFIN RESIN (MP03)

In a pressure-resistant closed reaction vessel, 320 parts of an ethylene-propylene-5-ethylidene-2-norbornene copolymer rubber (Dutral TER4033® of Enichem Co., Ltd.), 20 parts of N-[4-(2,3-epoxypropoxy-3,5-dimethylbenzyl] acrylamide, 20 parts of glycidyl methacrylate, 40 parts of styrene, 1.0 part of 1,1-bis (t-butylperoxy) 3,3,5-trimethylcyclohexane, 8.0 parts of potassium tertiary phosphate, and 0.2 part of an emulsifier (Latemul PS® of Kao Co., Ltd.) were added to 1500 parts of deionized water and an aqueous suspension was obtained with stirring. The aqueous solution obtained was stirred at 95° C. for one hour, then further stirred at 110° C. for three hours to complete the graft-polymerization. The particles obtained were rinsed with water to remove the potassium tertiary phosphate and Latemul PS before being dried, thereby obtaining the graft-modified polyolefin resin (MP03).

EXAMPLE 4: PRODUCTION OF GRAFT-MODIFIED POLYOLEFIN RESIN (MP04)

In a pressure-resistant closed reaction vessel, 490 parts of polypropylene (RB410® of Tokuyama Soda Co., Ltd.), 70 parts of N-[4-(2,3-epoxypropoxy-3,5-dimethylbenzyl] acrylamide, 35 parts of glycidyl methacrylate, 105 parts of styrene, 1.5 parts of di-t-butylperoxide, 10 parts of potassium tertiary phosphate, and 0.3 part of an emulsifier (Latemul PS® of Kao Co., Ltd.) were added to 1500 parts of deionized water and an aqueous suspension was obtained with stirring. The aqueous solution obtained was stirred at 100° C. for one hour, then further stirred at 150° C. for two hours to complete the graft-polymerization. The particles obtained were rinsed with water to remove the potassium tertiary phosphate and Latemul PS before being dried, thereby obtaining the graft-modified polyolefin resin (MP04).

EXAMPLE 5: PRODUCTION OF GRAFT-MODIFIED POLYOLEFIN RESIN (MP05)

In a pressure-resistant closed reaction vessel, 1470 parts of propylene-ethylene copolymer particles (containing 3% of ethylene and having 147° C. DSC melting point), 84 parts of N-[4-(2,3-epoxypropoxy-3,5-dimethylbenzyl] acrylamide, 21 parts of glycidyl methacrylate, and 525 parts of styrene, 3.78 parts of di-t-butylperoxide, 31.5 parts of potassium tertiary phosphate, and 0.945 part of an emulsifier (Latemul PS® of Kao Co., Ltd.) were added to 4200 parts of deionized water and an aqueous suspension was obtained with stirring. The aqueous solution obtained was stirred at 100° C. for one hour, then stirred at 150° C. for two hours to complete the graft-polymerization. The particles obtained were rinsed with water to remove the potassium tertiary phosphate and Latemul PS before being dried, thereby obtaining the graft-modified polyolefin resin (MP05).

EXAMPLE 6: PRODUCTION OF GRAFT-MODIFIED POLYOLEFIN RESIN (MP06)

A graft-modified polyolefin fiber (MP06) was obtained in the same way as in Example 5 except that 84 parts of N-[4-(2,3-epoxypropoxy-3,5-dimethylbenzyl] acrylamide and 21 parts of glycidyl methacrylate were replaced with 21 parts of N-[4-(2,3-epoxypropoxy-3,5-dimethylbenzyl] acrylamide and 84 parts of glycidyl methacrylate.

EXAMPLE 7: PRODUCTION OF GRAFT-MODIFIED POLYOLEFIN RESIN (MP07)

In a pressure-resistant closed reaction vessel, 1500 parts of ethylene-propylene-5-ethylidene-2-norbornene copolymer rubber (having iodine value of 12 and containing 24% of propylene), 72 parts of N-[4-(2,3-epoxypropoxy-3,5-dimethylbenzyl] acrylamide, 24 parts of glycidyl methacrylate, and 281 parts of styrene, 4.56 parts of 1,1-bis (t-butylperoxy) 3,3,5-trimethylcyclohexane, 31.5 parts of potassium tertiary phosphate, and 0.945 part of an emulsifier (Latemul PS® of Kao Co., Ltd.) were added to 6000 parts of deionized water and an aqueous suspension was obtained with stirring. The aqueous solution obtained was stirred at 100° C. for one hour, then further stirred at 110° C. for three hours to complete the graft-polymerization. The particles obtained were rinsed with water to remove the potassium tertiary phosphate and Latemul PS before being dried, thereby obtaining the graft-modified polyolefin resin (MP07).

EXAMPLE 8: PRODUCTION OF GRAFT-MODIFIED POLYOLEFIN RESIN (MP08)

A graft-modified polyolefin resin (MP08) was obtained in the same way as in Example 7 except that the ethylene-propylene-5-ethylidene-2-norbornene copolymer rubber was replaced with an ethylene-propylene copolymer rubber (containing 26% of polypylene).

EXAMPLE 9: PRODUCTION OF GRAFT-MODIFIED POLYOLEFIN RESIN (MP09)

In a pressure-resistant closed reaction vessel, 1470 parts of (RB410® of Tokuyama Soda Co., Ltd.), 52.5 parts of N-[4-(2,3-epoxypropoxy-3,5-dimethylbenzyl] acrylamide, 52.5 parts of glycidyl methacrylate, 525 parts of styrene, 3.8 parts of di-t-butylperoxide, 31.5 parts of potassium tertiary phosphate, and 0.945 part of an emulsifier (Latemul PS® of Kao Co., Ltd.) were added to 4200 parts of deionized water and an aqueous suspension was obtained with stirring. The aqueous solution obtained was stirred at 100° C. for one hour, then further stirred at 150° C. for two hours to complete the graft-polymerization. The particles obtained were rinsed with water to remove the potassium tertiary phosphate and Latemul PS before being dried, thereby obtaining the graft-modified polyolefin resin (MP09).

COMPARISON EXAMPLE 1: PRODUCTION OF GRAFT-MODIFIED POLYOLEFIN RESIN (MP010)

A graft-modified polyolefin resin (MP010) was obtained in the same way as in Example 1 except that 31 parts of N-[4-(2,3-epoxypropoxy-3,5-dimethylbenzyl] acrylamide and 31 parts of glycidyl methacrylate were replaced with 62 parts of N-[4-(2,3-epoxypropoxy-3,5-dimethylbenzyl] acrylamide.

COMPARISON EXAMPLE 2: PRODUCTION OF GRAFT-MODIFIED POLYOLEFIN RESIN (MP011)

A graft-modified polyolefin resin (MP011) was obtained in the same way as in Example 1 except that 31 parts of N-[4-(2,3-epoxypropoxy-3,5-dimethylbenzyl] acrylamide, 31 parts of glycidyl methacrylate and 63 parts of styrene were replaced with 125 parts of styrene.

COMPARISON EXAMPLE 3: PRODUCTION OF GRAFT-MODIFIED POLYOLEFIN RESIN (MP012)

A graft-modified polyolefin resin (MP012) was obtained in the same way as in Example 5 except that 84 parts of N-[4-(2,3-epoxypropoxy-3,5-dimethylbenzyl] acrylamide and 21 parts of glycidyl methacrylate were not used.

COMPARISON EXAMPLE 4: PRODUCTION OF GRAFT-MODIFIED POLYOLEFIN RESIN (MP013)

A graft-modified polyolefin resin (MP013) was obtained in the same way as in Example 5 except that 84 parts of N-[4-(2,3-epoxypropoxy-3,5-dimethylbenzyl] acrylamide and 21 parts of glycidyl methacrylate were replaced with 105 parts of glycidyl methacrylate.

COMPARISON EXAMPLE 5: PRODUCTION OF GRAFT-MODIFIED POLYOLEFIN RESIN (MP014)

A graft-modified polyolefin resin (MP014) was obtained in the same way as in Example 7 except that 72 parts of N-[4-(2,3-epoxypropoxy-3,5-dimethylbenzyl] acrylamide and 24 parts of glycidyl methacrylate were replaced with 96 parts of glycidyl methacrylate.

COMPARISON EXAMPLE 6: PRODUCTION OF GRAFT-MODIFIED POLYOLEFIN RESIN (MP015)

A graft-modified polyolefin resin (MP015) was obtained in the same way as in Example 8 except that 72 parts of N-[4-(2,3-epoxypropoxy-3,5-dimethylbenzyl] acrylamide and 24 parts of glycidyl methacrylate were replaced with 96 parts of glycidyl methacrylate.

COMPARISON EXAMPLE 7: PRODUCTION OF GRAFT-MODIFIED POLYOLEFIN RESIN (MP016)

A graft-modified polyolefin resin (MP016) was obtained in the same way as in Example 9 except that 52.5 parts of N-[4-(2,3-epoxypropoxy-3,5-dimethylbenzyl] acrylamide and 52.5 parts of glycidyl methacrylate were not used.

COMPARISON EXAMPLE 8: PRODUCTION OF GRAFT-MODIFIED POLYOLEFIN RESIN (MP017)

A graft-modified polyolefin resin (MP017) was obtained in the same way as in Example 9 except that 52.5 parts of N-[4-(2,3-epoxypropoxy-3,5-dimethylbenzyl] acrylamide and 52.5 parts of glycidyl methacrylate were replaced with 105 parts of glycidyl methacrylate.

EXAMPLES 10–13 AND COMPARISON EXAMPLES 9–12

The components (A) (graft-modified polyolefin resins) and the components (B) (polyester resins) as listed below were used to produce resin compositions in combinations and proportions of components shown in Table 1, and test pieces for characteristic evaluation were prepared.

Components (A)

Graft-modified polyolefin resins: The graft-modified polyolefin resins produced in Examples 1 and 2 and Comparison Examples 1 and 2, being abbreviated as MP0 (MP01 and MP02 and MP010 and MP011) in the table.

Components (B)

polyester resin: Polybutylene terephthalate (Duranex 2002® of polyplastic Co., Ltd., being abbreviated as PBT in the table).

The catalyst in the table is tetrabutyl phosphonium bromide (of Aldrich Chemical Co., Ltd.) and EGMA is an ethylene-glycidyl methacrylate copolymer (Bond Fast E® of Sumitomo Kagaku Co., Ltd.).

The resin compositions and test pieces were prepared in the following ways. The components were dry-blended at the proportions shown in Table 1 and fed into a two-axes extruder (TEX44® of Nihon Seikosho Co., fLtd.) set at 240° C. at a rate of 15 kg per hour to melt and knead at 100 rpm of screw revolution. The extruded mixture was water-cooled to make pellets, then dried at 120° C. for four hours under reduced pressure to obtain desired resin compositions. The resin compositions were injection-molded at a cylinder temperature of 245° C. and at a mold temperature of 60° C., thereby perparing the test pieces.

Characteristic evaluation of the resin compositions and molded articles of the present invention were made in the following method.

Impact characteristic: Izod strength with notch was measured at 23° C. and –30° C. in accordance with ASTM D256.

Tensile characteristic: Tensile breaking elongation was measured in accordance with ASTM D638.

Bending elastic modulus: Bending elastic modulus was measured in accordance with ASTM D790.

Bending strength: Maximum bending strength was measured in accordance with ASTM D790.

The results of the characteristic evaluation were shown in Table 1.

TABLE 1

| | Compositions (parts) | | | | Characteristics of resin compositions (molded articles) | | | |
|---|---|---|---|---|---|---|---|---|
| | PBT | MPO Lower: Kind | EGMA | Catalyst | Izod Strength kgcm/cm | Tensile breaking elongation % | Bending elastic modulus kg/mm$^2$ | Maximum bending strength kg/mm$^2$ |
| Ex. 10 | 85 | 15 MPO1 | — | 0.085 | 51 | 115 | 195 | 605 |
| Ex. 11 | 80 | 20 MPO1 | — | 0.08 | 72 | 158 | 178 | 533 |
| Ex. 12 | 70 | 30 MPO1 | — | — | 96 | 195 | 123 | 376 |
| Ex. 13 | 80 | 20 MPO2 | — | 0.08 | 90 | 60 | 179 | 541 |
| C. Ex. 9 | 85 | 15 MPO10 | — | 0.085 | 21 | 35 | 192 | 590 |
| C. Ex. 10 | 80 | 20 MPO10 | — | 0.08 | 58 | 57 | 177 | 540 |
| C. Ex. 11 | 70 | 30 MPO11 | — | — | 25 | 15 | 112 | 254 |
| C. Ex. 12 | 80 | — | 20 | 0.08 | Resin was not filled into the mold due to poor fluidity. | | | |

EXAMPLES 14–21 AND COMPARISON EXAMPLES 13–20

The components (A) (graft-modified polyolefin resins) and the components (B) (polyester resins and polyamide resins) as listed below were used to produce resin compositions in combinations and proportions of components shown in Table 2, and test pieces for characteristic evaluation were prepared.

Components (A)

Graft-modified polyolefin resins: The graft-modified polyolefin resins produced in Examples 1 to 4 and Comparison Examples 1 and 2, being abbreviated as MP0 (MP01 to MP04 and MP010 and MP011) in the table.

Components (B)

polyester resin: Polybutylene terephthalate (Duranex 800FP® of polyplastic Co., Ltd., being abbreviated as PBT in the table).

polyamide resin: Nylon 66 (UBE2020B® of Ube Kosan Co., Ltd., being abbreviated as PA in the table).

The catalyst in the table is tetrabutyl phosphonium bromide (of Aldrich Chemical Co., Ltd.) and EGMA is an ethylene-glycidyl methacrylate copolymer (Bond Fast E® of Sumitomo Kagaku Co., Ltd.).

The resin compositions and test pieces were prepared in the following ways. The components were dry-blended at the proportions shown in Table 2 and fed into a two-axes extruder (TEX44® of Nihon Seikosho Co., fLtd.) set at 275° C. at a rate of 15 kg per hour to melt and knead at 100 rpm of screw revolution. The extruded mixture was water-cooled to make pellets, then dried at 120° C. for four hours under reduced pressure to obtain desired resin compositions. The resin compositions were injection-molded at a cylinder temperature of 280° C. and at a mold temperature of 80° C., thereby perparing the test pieces.

Characteristic evaluation of the resin compositions and molded articles of the present invention were made in the following method.

Injection moldability: Evaluated at three levels in accordance with the following standard.

○: A molded article has no sink marks, burrs, and flow marks.

Δ: No pressure keeping effect is seen or a molded article has sink marks, burrs, and flow marks.

X: Fluidity is low, and short shot is likely to occur.

Frequency of defects: Evaluated at three levels in accordance with the following standard.

○: A molded article has almost no cracks upon cutting a runner and also has almost no cracks by natural drop after cutting.

Δ: A molded article has cracks at a frequency of less than 5% upon cutting a runner.

X: A molded article has cracks at a frequency of not less than 5% upon cutting a runner and has cracks by natural drop after cutting.

Impact characteristic: Izod strength with notch was measured at 23° C. and −30° C. in accordance with ASTM D256.

Tensile characteristic: Tensile breaking elongation was measured in accordance with ASTM D638.

Bending elastic modulus: Bending elastic modulus was measured in accordance with ASTM D790.

Bending strength: Maximum bending strength was measured in accordance with ASTM D790.

Thermal deformation temperature: Measured with a load of 4.6 kg/cm$^2$ in accordance with ASTM D648.

The results of the characteristic evaluation were shown in Table 2.

EXAMPLES 22–29 AND COMPARISON EXAMPLES 21–27

The components (A) (graft-modified polyolefin resis) and the components (B) (polycarbonate resins) as listed below were used to produce resin compositions in combinations and proportions of components shown in Table 3, and test pieces for characteristic evaluation were prepared.

Components (A)

Graft-modified polyolefin resins: The graft-modified polyolefin resins produced in Examples 5 to 8 and Comparison Examples 3 to 6, being abbreviated as MP0 (MP05 to MP08 and MP012 to MP015) in the table.

Components (B)

Polycarbonate resins: Polycarbonate (Panlight L-1250® of Teijin kasei Co., Ltd., being abbreviated as PC in the table).

The catalyst in the table is tetrabutyl phosphonium bromide (of Aldrich Chemical Co., Ltd.), EPDM is an ethylene-propylene non-conjugated diene copolymer (EP181SP® of JSR Co., Ltd.), PP is a polypropylene (Hipall B200® of Mitsui Sekiyu Kagaku Co., Ltd.), and GF is a glass fiber (Chopped strand 03T-511/P® of Nihon Denki Glass Co., Ltd.).

The resin compositions and test pieces were prepared in the following ways. The components were dry-blended at the proportions shown in Table 3 and fed into a two-axes extruder (TEX44® of Nihon Seikosho Co., fLtd.) set at 280° C. at a rate of 15 kg per hour to melt and knead at 100 rpm of screw revolution. The extruded mixture was water-cooled

TABLE 2

| | Compositions (parts) | | | | | Characteristics of resin compositions and molded articles | | | | | | |
|---|---|---|---|---|---|---|---|---|---|---|---|---|
| | PA | PBT | MPO Lower: kind | EGMA | Catalyst | Injection molding property | Frequence of defects | Izod Strength kgcm/cm | Tensile breaking elongation % | Bending elastic modulus kg/mm$^2$ | Maximum bending strength kg/mm$^2$ | Thermal deformation temp. °C. |
| Ex. 14 | 30 | 70 | 5 MPO1 | — | 0.07 | ○ | ○ | 8.5 | 49 | 264 | 845 | 180 |
| Ex. 15 | 30 | 70 | 10 MPO1 | — | 0.07 | ○ | ○ | 12.5 | 75 | 255 | 794 | 170 |
| Ex. 16 | 30 | 70 | 5 MPO2 | — | 0.07 | ○ | ○ | 9.5 | 88 | 261 | 840 | 178 |
| Ex. 17 | 30 | 70 | 5 MPO3 | — | 0.07 | ○ | ○ | 8.2 | 45 | 266 | 851 | 179 |
| Ex. 18 | 30 | 70 | 10 MPO3 | — | 0.10 | ○ | ○ | 12.1 | 97 | 252 | 784 | 169 |
| Ex. 19 | 70 | 30 | 15 MPO4 | — | — | ○ | ○ | 8.2 | 101 | 290 | 971 | 189 |
| Ex. 20 | 50 | 50 | 30 MPO4 | — | — | ○ | ○ | 9.6 | 69 | 244 | 722 | 167 |
| Ex. 21 | 30 | 70 | 10 MPO4 | — | 0.10 | ○ | ○ | 6.3 | 113 | 272 | 895 | 183 |
| C. Ex. 13 | 70 | 30 | — | — | — | Δ | X | 3.3 | 11 | 297 | 996 | 198 |
| C. Ex. 14 | 50 | 50 | — | — | — | X | X | 2.1 | 3 | 291 | 963 | 190 |
| C. Ex. 15 | 30 | 70 | — | — | — | Δ | X | 2.8 | 9 | 289 | 952 | 184 |
| C. Ex. 16 | 30 | 70 | 5 MPO10 | — | 0.07 | ○ | ○ | 7.1 | 8 | 257 | 829 | 178 |
| C. Ex. 17 | 30 | 70 | 5 MPO11 | — | — | Δ | X | 2.3 | 5 | 245 | 788 | 175 |
| C. Ex. 18 | 70 | 30 | — | 15 | — | X | X | 6.2 | 33 | 268 | 866 | 183 |
| C. Ex. 19 | 50 | 50 | — | 30 | 0.10 | X | Resin was not filled into the mold due to poor fluidity. (short shot) | | | | | |
| C. Ex. 20 | 30 | 70 | — | 10 | 0.10 | Δ | X | 4.1 | 10 | 253 | 808 | 174 | to make pellets, then dried at 120° C. for twelve hours under reduced pressure to obtain desired resin compositions. The resin compositions were injection-molded at a cylinder temperature of 280° C. and at a mold temperature of 80° C., thereby perparing the test pieces.

Characteristic evaluation of the resin compositions and molded articles of the present invention were made in the following method.

Bending elastic modulus: Bending elastic modulus was measured in accordance with ASTM D790.

Impact characteristic: Izod strength with notch was measured at 23° C. and −30° C. in accordance with ASTM D256.

Thermal deformation temperature: Measured with a load of 4.6 kg/cm$^2$ in accordance with ASTM D648.

Organic solvent resistance: Test pieces of 2 mm thickness were immersed in xylene at 23° C. for six hours and their surface conditions were observed by naked eyes. The 20 test pieces having no cracks were marked o, one or two test pieces having cracks were marked Δ and three or more test pieces having cracks were marked X.

The results of characteristic evaluation were shown in Table 3.

Components (A)
Graft-modified polyolefin resins: The graft-modified polyolefin resins produced in Examples 1 and 9 and Comparison Examples 7 and 8, being abbreviated as MP0 (MP01, MP09, MP016 and MP017) in the table.

Components (B)
Polycarbonate resin: Polycarbonate (Panlight L-1250® of Teijin kasei Co., Ltd., being abbreviated as PC in the table).

Components (C)
Polyorefin resin: Polypropylene (RB410® of Tokuyama Soda Co., Ltd.), being addreviated as PP in the table).

The catalyst in the table is tetrabutyl phosphonium bromide (of Aldrich Chemical Co., Ltd.).

The resin compositions and test pieces were prepared in the following ways. The components were dry-blended at the proportions shown in Table 4 and fed into a two-axes extruder (TEX44® of Nihon Seikosho Co., fLtd.) set at 275° C. at a rate of 15 kg per hour to melt and knead at 100 rpm of screw revolution. The extruded mixture was water-cooled to make pellets, then dried at 120° C. for ten hours under reduced pressure to obtain desired resin compositions. The resin compositions were injection-molded at a cylinder

TABLE 3

| | Compositions (parts) | | | | Characteristics of resin compositions (molded articles) | | | |
|---|---|---|---|---|---|---|---|---|
| | PC | MPO Lower: kind | Catalyst | GF | Bending elastic modulus kg/mm$^2$ | Izod Strength kgcm/cm | Thermal deformation temp. ° C. | Organic solvent resistance |
| Ex. 22 | 90 | 10 MPO5 | — | — | 184 | 28.0 | 137 | o |
| Ex. 23 | 90 | 10 MPO5 | — | 30 | 644 | 28.7 | 149 | o |
| Ex. 24 | 90 | 10 MPO5 | 0.09 | — | 189 | 29.5 | 139 | o |
| Ex. 25 | 80 | 20 MPO5 | — | — | 179 | 24.4 | 135 | o |
| Ex. 26 | 90 | 10 MPO6 | 0.09 | — | 187 | 28.8 | 139 | o |
| Ex. 27 | 90 | 10 MPO7 | — | — | 171 | 55.2 | 131 | o |
| Ex. 28 | 80 | 20 MPO7 | — | — | 162 | 60.7 | 125 | o |
| Ex. 29 | 90 | 10 MPO8 | — | — | 178 | 54.0 | 129 | o |
| C. Ex. 21 | 100 | — | — | — | 200 | 15.1 | 144 | X |
| C. Ex. 22 | 90 | 10 PP | — | — | 137 | 8.9 | 130 | X |
| C. Ex. 23 | 90 | 10 EPDM | — | — | 125 | 11.2 | 122 | X |
| C. Ex. 24 | 90 | 10 MPO12 | — | — | 140 | 13.0 | 133 | X |
| C. Ex. 25 | 90 | 10 MPO13 | — | — | 141 | 19.8 | 128 | Δ |
| C. Ex. 26 | 90 | 10 MPO14 | 0.09 | — | 122 | 25.3 | 124 | Δ |
| C. Ex. 27 | 90 | 10 MPO15 | — | — | 129 | 25.0 | 123 | X |

EXAMPLES 30–34 AND COMPARISON EXAMPLES 28–32

The components (A) (graft-modified polyolefin resins) and the components (B) (polycarbonate resins), and components (C) (polyolefin resins) as listed below were used to produce resin compositions in combinations and proportions of components shown in Table 4, and test pieces for characteristic evaluation were prepared.

temperature of 280° C. and at a mold temperature of 80° C., thereby perparing the test pieces.

Characteristic evaluation of the resin compositions and molded articles of the present invention were made in the following method.

Impact characteristic: Izod strength with notch was measured at 23° C. and −30° C. in accordance with ASTM D256.

Bending elastic modulus: Bending elastic modulus was measured in accordance with ASTM D790.

Organic solvent resistance: Test pieces of 2 mm thickness were immersed in xylene at 23° C. for six hours and their surface conditions were observed by naked eyes. The 20 test pieces having no cracks were marked ○, one or two test pieces having cracks were marked Δ and three or more test pieces having cracks were marked X.

The results of characteristic evaluation were shown in Table 4.

TABLE 4

| | Compositions (parts) | | | | Characteristics of resin compositions (molded articles) | | | |
|---|---|---|---|---|---|---|---|---|
| | PC | PP | MPO Lower: kind | Catalyst | Izod Strength kg · cm/cm | Bending elastic modulus kg/mm$^2$ | Thermal deformation temp. ° C. | Organic solvent resistance |
| Ex. 30 | 90 | 10 | 10 MPO9 | 0 | 35.6 | 19800 | 133 | ○ |
| Ex. 31 | 80 | 20 | 15 MPO9 | 0 | 17.4 | 18800 | 126 | ○ |
| Ex. 32 | 70 | 30 | 20 MPO9 | 0.07 | 13.4 | 17100 | 112 | ○ |
| Ex. 33 | 90 | 10 | 10 MPO1 | 0 | 38.1 | 18200 | 128 | ○ |
| Ex. 34 | 80 | 20 | 15 MPO1 | 0 | 41.0 | 16500 | 115 | ○ |
| C. Ex. 28 | 90 | 10 | 10 MPO16 | 0 | 9.5 | 18500 | 130 | X |
| C. Ex. 29 | 90 | 10 | 10 MPO16 | 0.09 | 7.3 | 18600 | 132 | X |
| C. Ex. 30 | 80 | 20 | 15 MPO16 | 0 | 6.5 | 18200 | 121 | X |
| C. Ex. 31 | 70 | 30 | 20 MPO16 | 0.07 | 6.9 | 16900 | 106 | Δ |
| C. Ex. 32 | 90 | 10 | 10 MPO17 | 0 | 14.7 | 16400 | 129 | Δ |

INDUSTRIAL APPLICABILITY

As described in detail, the resin compositions containing the graft-modified polyolefin resins according to the present invention have not only well-balanced mechanical properties such as impact resistance, elongation and rigidity, but excellent moldability. The resin compositions of the present invention having such characteristics are useful for various engineering plastics, particularly for automobile parts, home electronic appliances, industrial parts, sports goods and instruments, and the like.

We claim:

1. A graft-modified polyolefin resin obtained by preparing a aqueous suspension containing
   (a1) 100 parts by weight of a polyolefin resin,
   (a2) 0.1 to 30 parts by weight of a mixture of 1 to 1000 parts by weight of an unsaturated glycidyl ester to 100 parts by weight of a compound having a glycidyl group as represented by a general formula (I):

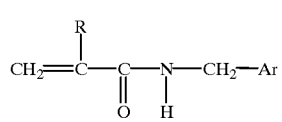

(I)

wherein Ar is an aromatic hydrocarbon group of $C_6$–$C_{23}$ having at least one glycidyloxy group, and R is a hydrogen atom or a methyl group, (a3) 0.1 to 500 parts by weight of a vinyl monomer, and
   (a4) 0.001 to 10 parts by weight of a radical initiator to 100 parts by weight in total of said components (a2) and (a3), to thus impregnate said component (a1) with the components (a2) and (a3) in said aqueous suspension, and polymerizing the components (a2) and (a3) onto the component (a1).

2. The graft-modified polyolefin resin as defined in claim 1, wherein the component (a1) is a polymer comprising not less than one compound, or a mixture of not less than two said polymers comprising at least one compound selected from the group consisting of ethylene, propyrene, 1-butene, 1-pentene, isobutene, butadiene, isoprene, chloroprene, phenylpropadiene, cyclopentadiene, 1,3-cyclohexadiene, 1,4-hexadiene, 1,3-octadiene, 1,5-cyclooctadiene, methylene norbornene, 1,5-norbornadiene, ethylidene norbornene, and α, ω-nonconjugated dienes.

3. The graft-modified polyolefin resin as defined in claim 1, wherein the compound having glycidyl group as represented by the general formula (I) is a compound represented by a structural formula (II):

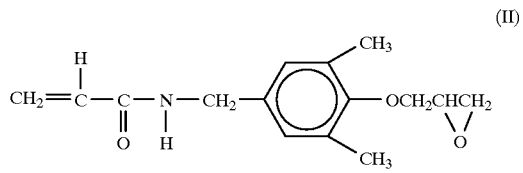

(II)

4. The graft-modified polyolefin resin as defined in claim 1, wherein the unsaturated glycidyl ester (a2) is glycidyl methacrylate.

5. The graft-modified polyolefin resin as defined in claim 1, wherein the component (a3) is at least one compound selected from the group consisting of aromatic vinyl compounds, acrylic acid alkyl esters containing an alkyl group having 1 to 22 carbon atoms, methacrylic acid alkyl esters containing an alkyl group having 1 to 22 carbon atoms, vinyl alkyl ethers containing group having 1 to 22 carbon atoms, vinyl alcohols, unsaturated nitrile compounds, unsaturated amino compounds, maleic acid dialkyl esters containing an alkyl group having 1 to 9 carbons atoms, allyl alkyl ethers containing an alkyl group having 1 to 8 carbon atoms, allyl acrylic acid ester, diene compounds, maleic acid anhydride, maleic acid, acrylic acid, methacrylic acid and vinyl acetate.

6. A resin composition comprising (A) 1 to 100 parts by weight of the graft-modified polyolefin resin as defined in claim 1, and (B) 100 parts by weight of a least one resin selected from the group consisting of polyester resins, polyamide resins and polycarbonate resins.

7. A resin composition comprising (A) 1 to 100 parts by weight of the graft-modified polyolefin resins as defined in claim 1, 100 parts by weight of resins comprising (B) 95 to 50 parts by weight of at least one resin selected from the group consisting of polyester resins, polyamide resins and polycarbonate resins, and (C) 5 to 50 parts by weight of a polyolefin resin.

8. A resin composition comprising 1 to 100 parts by weight of at least one filler selected from the group consisting of silica, talc, mica, glass fiber, neutral clay, carbon fiber, aromatic polyamide fiber, silicon carbide fiber, and titanic acid fiber to 100 parts by weight of the resin composition as defined in claim 6 or 7.

9. A resin composition comprising 1 to 50 parts by weight of at least one flame retardant to 100 parts by weight of the resin component in the resin compositions as defined in claim 6 or 7, said flame retardant being selected from the group consisting of tetrabromobisphenol A, 2,2-bis (4-hydroxy-3,5-dibromophenyl) propane, hexabromobenzene, tris (2,3-dibromopropyl) isocyanurate, 2,2-bis (4-hydroxyethoxy-3,5-dibromophenyl) propane, decabromodiphenyloxide, brominated polyphosphate, chlorinated polyphosphate, chlorinated paraffin, ammonium phosphate, tricresyl phosphate, triethyl phosphate, tris-chloroethyl phosphate, tris-($\beta$-chloroethyl) phosphate, tris-dichloropropyl phosphate, cresyl phenyl phosphate, xylenyl diphenyl phosphate, acidic phosphoric acid ester, red phosphorus, tin oxides, antimony trioxide, zirconium hydroxide, barium metaborate, aluminium hydroxide, magnesium hydroxide, brominated polystyrenes, brominated poly $\alpha$-methylstyrenes, brominated polycarbonates, brominated polyepoxy resins, chlorinated polyethylenes, clorinated poly $\alpha$-methylstyrenes, chlorinated polycarbonates and chlorinated polyepoxy resins.

\* \* \* \* \*